(12) United States Patent
Dube et al.

(10) Patent No.: US 11,381,571 B2
(45) Date of Patent: Jul. 5, 2022

(54) AUTHENTICATION FRAMEWORK FOR RESOURCE ACCESS ACROSS ORGANIZATIONS

(71) Applicant: Microsoft Technology Licensing, LLC, Redmond, WA (US)

(72) Inventors: Anshul Dube, Brooklyn, NY (US); Parul Manek, Redmond, WA (US); Steven Mark Silverberg, Bellevue, WA (US); Shankaranand Arunachalam, Redmond, WA (US); Jason Craig Nelson, Woodinville, WA (US); Andrew Burke Ryan, Seattle, WA (US); Robert A. Lowe, Redmond, WA (US); Ganesh Pandey, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 170 days.

(21) Appl. No.: 16/773,526

(22) Filed: Jan. 27, 2020

(65) Prior Publication Data
US 2021/0234864 A1 Jul. 29, 2021

(51) Int. Cl.
*H04L 9/40* (2022.01)

(52) U.S. Cl.
CPC ........ *H04L 63/102* (2013.01); *H04L 63/0884* (2013.01)

(58) Field of Classification Search
CPC .................... H04L 63/102; H04L 63/0884
See application file for complete search history.

(56) References Cited

U.S. PATENT DOCUMENTS

| 8,824,664 | B1* | 9/2014 | Ristock | H04L 63/08 |
| | | | | 379/266.03 |
| 9,288,214 | B2 | 3/2016 | Chang et al. | |
| 9,992,186 | B1* | 6/2018 | Drozd | H04L 63/0807 |
| 10,044,723 | B1* | 8/2018 | Fischer | H04L 63/0807 |
| 2009/0030906 | A1* | 1/2009 | Doshi | G06F 16/27 |
| 2013/0117419 | A1 | 5/2013 | Alarid et al. | |
| 2014/0123240 | A1* | 5/2014 | Seo | H04L 63/104 |
| | | | | 726/4 |
| 2015/0089622 | A1* | 3/2015 | Sondhi | H04L 63/20 |
| | | | | 726/9 |
| 2017/0329957 | A1* | 11/2017 | Vepa | G06F 21/34 |

(Continued)

OTHER PUBLICATIONS

"Enable access to G Suite using OAuth 2.0", Retrieved from: https://help.bittitan.com/hc/en-us/articles/115008106967-Enable-access-to-G-Suite-using-OAuth-2-0, Retrieved Date: Aug. 13, 2019, 12 Pages.

(Continued)

*Primary Examiner* — Jason Chiang
(74) *Attorney, Agent, or Firm* — Christopher J. Volkmann; Kelly, Holt & Christenson PLLC

(57) ABSTRACT

A client application is specified by a target tenant and represented in an OAuth provider, along with a corresponding secret. A source tenant consents to permissions to be executed by the client application on a resource of the source tenant. A target service uses the secret to obtain an access token from an authorization server coupled to the source tenant and uses the access token to obtain access, specified by the permissions, to the resource served by a source service acting on behalf of the source tenant.

20 Claims, 6 Drawing Sheets

(56) References Cited

U.S. PATENT DOCUMENTS

| | | | | |
|---|---|---|---|---|
| 2018/0013763 | A1* | 1/2018 | Wilson | H04L 63/0884 |
| 2018/0077138 | A1* | 3/2018 | Bansal | H04L 63/0815 |
| 2018/0083835 | A1 | 3/2018 | Cole et al. | |
| 2018/0213398 | A1* | 7/2018 | Sharif | H04W 12/069 |
| 2019/0334757 | A1* | 10/2019 | Hill | H04L 47/70 |
| 2020/0084198 | A1* | 3/2020 | Inoue | H04L 63/083 |
| 2021/0136083 | A1* | 5/2021 | Gordon | G06F 21/10 |

OTHER PUBLICATIONS

"Fusion Middleware Administrator's Guide far Oracle Access Management", Retrieved from: https://web.archive.org/web/20150928030604/https:/docs.oracle.com/cd/E40329_01/admin.1112/e27239/oauthunderstanding.htm, Sep. 28, 2015, 14 Pages.

Banerjee, Soman, "Access Management and Federation Service", Retrieved from: https://somanbanerjee.blogspot.com/, Jul. 1, 2018, 39 Pages.

Hardt, D., "The OAuth 2.0 Authorization Framework", Retrieved from: https://tools.ietf.org/html/rfc6749#section-1.3.4, Oct. 2012, 76 Pages.

Kunchakuri, Vijay Kumar, "New! Secure Mail Supports OAuth-based Modern Style Authentication", Retrieved from: https://www.citrix.com/blogs/2018/03/19/new-secure-mail-supports-oauth-based-modern-style-authentication/, Mar. 19, 2018, 11 Pages.

Maguire, et al., "Perform a G Suite migration", Retrieved from: https://docs.microsoft.com/en-us/exchange/mailbox-migration/perform-g-suite-migration. Aug. 10, 2019. 30 Pages.

* cited by examiner

AUTHENTICATION FRAMEWORK FOR RESOURCE ACCESS ACROSS ORGANIZATIONS

BACKGROUND

Computing systems are currently in wide use. Some computing systems include multi-tenant computing systems in which services are hosted for multiple different tenants. Each tenant may be an organization. The computing system resources are often segregated among the tenants, so that one tenant does not have access to the resources of other tenants in the multi-tenant system.

It is not uncommon for a tenant computing system to need access to the resources of another tenant computing system. For instance, assume that one organization merges with another organization, or sells a business unit to a different organization. The acquiring organization may then wish to obtain access to the electronic mail accounts (the mailboxes) of the organization or business unit that is being acquired. In current systems, this has often involved giving a cloud-based service broad permissions in order to perform the migration of resources (e.g., in order to perform the migration of mailboxes).

It is also not uncommon for multi-tenant computing systems to use an authorization platform, such as OAuth, to implement authorization. Thus, the services may interact with an OAuth provider that implements a separation between different organizations. For instance, if a tenant organization administrator registers a client with the OAuth provider, then that registration is scoped to the tenant organization and thus cannot be seen or accessed by other tenant organizations.

The discussion above is merely provided for general background information and is not intended to be used as an aid in determining the scope of the claimed subject matter.

SUMMARY

A client application is specified by a target tenant and represented in an OAuth provider, along with a corresponding secret. A source tenant consents to permissions to be executed by the client application on a resource of the source tenant. A target service uses the secret to obtain an access token from an authorization server coupled to the source tenant and uses the access token to obtain access, specified by the permissions, to the resource served by a source service acting on behalf of the source tenant.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it is not uncommon for one tenant computing system (e.g., a target tenant computing system) to need access to resources of another tenant computing system (e.g., a source tenant computing system). This has often been done using an authorization framework outside of authentication. For example, when mailbox migration is performed, this has often involved administrators setting up an object in an OAuth provider that authorizes the access to different mailboxes and the direction of migration. However, a cloud-based service is then provided with ubiquitous control, and the cloud-based service then executes the mailbox migration. The authorization received by the cloud-based service, however, is much broader than what is needed to actually access the resources as desired (e.g., to migrate the mailboxes).

Therefore, the present discussion proceeds with respect to an architecture in which the administrators of the target tenant and the source tenant are in control of the resource access. In addition, the target service accessing the resources on behalf of the target tenant is able to only act within an authorization framework, and according to permissions for which it is authorized. The administrators arrange authorization so the target service can use client credentials in obtaining authorization to access the resources and only perform operations defined by the permissions.

Figure 1:
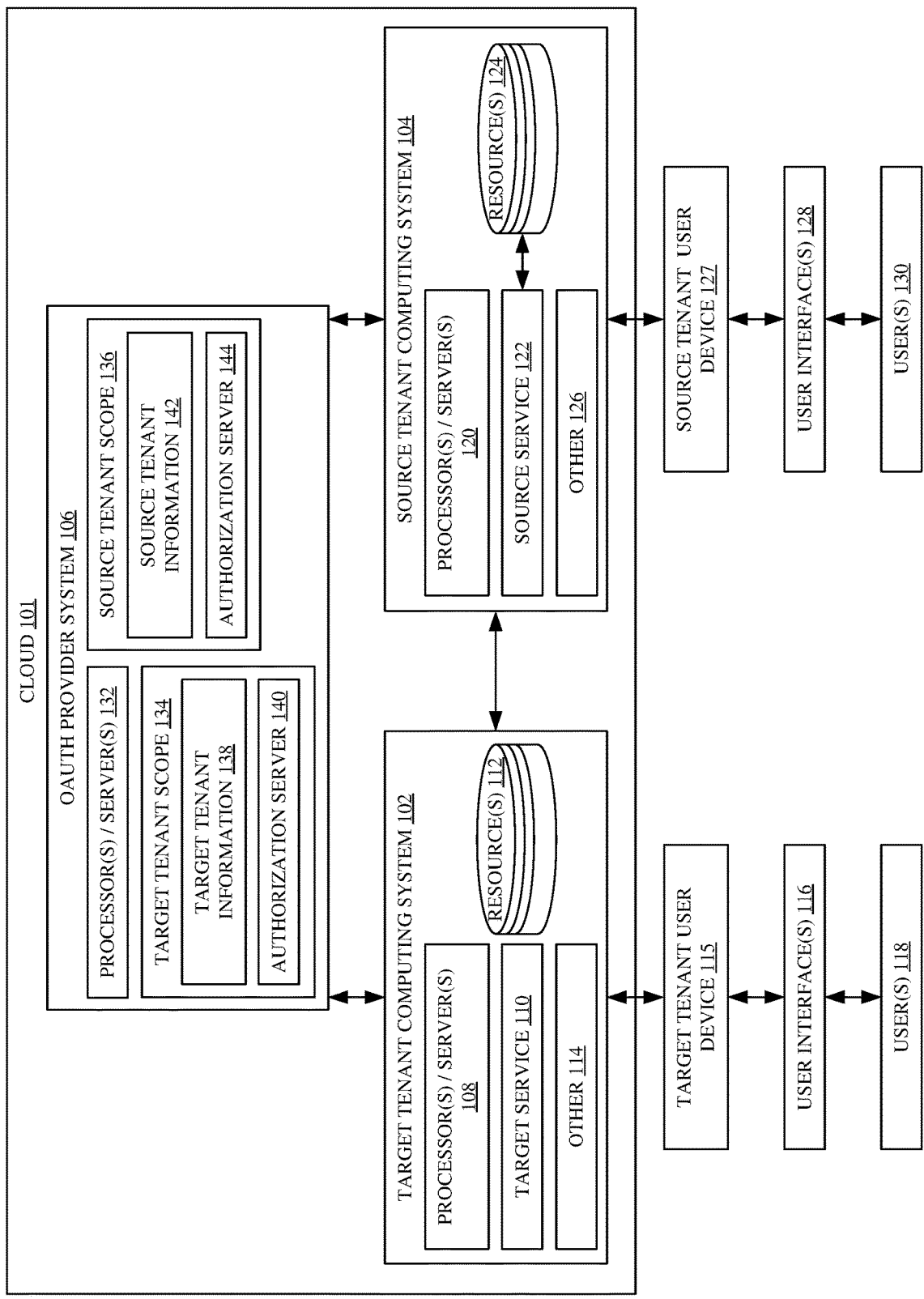
FIG. 1 is a block diagram of one example of a computing system architecture.

FIG. 1 is a block diagram showing one example of a computing system architecture 100 in which a target tenant computing system 102 and a source tenant computing system 104 implement cross-service authorization using OAuth provider system 106, in a cloud 101. Target tenant computing system 102 illustratively include one or more processors or servers 108, and it implements a target service 110 that may serve access to resources 112. It can include other items 114 as well. In the example shown in FIG. 1, target tenant computing system 102 is shown generating user interfaces 116, through a user device 115, for interaction by one or more users 118. Users 118 illustratively interact with user interfaces 116 in order to control and manipulate some portions of target tenant computing system 102 and OAuth provider system 106.

Source tenant computing system 104 illustratively includes one or more processors or servers 120, and implements a source service 122 that can serve access to resources 124. Source tenant computing system 104 can include other items 126 as well. in the example shown in FIG. 1, source tenant computing system 104 is shown generating user interfaces 128 for interaction by one or more users 130. Users 130 illustratively interact with user interfaces 128, through a user device 127, in order to control and manipulate some items of source tenant computing system 104 and OAuth provider system 106.

In FIG. 1, target tenant computing system 102 is assumed to need access to resources 124 of source tenant computing system 104. For purposes of the present discussion, it will be assumed that the resources 124 are mailboxes served and maintained by an email system (e.g., source service 122), and the access sought by target tenant computing system 102 is to migrate some of the mailboxes in resources 124 to target tenant computing system 102. Target service 110 is illustratively a cloud-based service implemented by target tenant computing system 102, or acting on behalf of target tenant computing system 102. Source service 122 is also illustratively a cloud-based service acting on behalf of source tenant computing system 104.

Also, in the example shown in FIG. 1, it is assumed that OAuth provider system 106 has organization scope. This means that OAuth provider system 106 has a separation between different organizations (or tenants). It can include one or more processors or servers 132 and then have information for target tenant computing system 102 in a target tenant scope 134, and information for source tenant computing system 104 in a source tenant scope 136. In the example shown in FIG. 1, target tenant scope 134 includes target tenant information 138 and it can include an authorization server 140 that is coupled to, or implemented by, target tenant computing system 102. Authorization server 140 performs the authorization flows that are used to authorize other services to access resources 112 on target tenant computing system 102, and to also assist in authorizing target service 110 to access resources 124 in source tenant computing system 104.

Source tenant scope 136 in OAuth provider system 106 illustratively includes source tenant information 142, and it can also include an authorization server 144 that is coupled to, or implemented by, source tenant computing system 104. Authorization server 144 thus implements flows for authorizing source service 122 to access resources 112 in other tenant computing systems, and to authorize other services in accessing resources 124 in source tenant computing system 104.

As one example, assume that an administrator of target tenant computing system 102 has registered a client (e.g., target service 110) with OAuth provider 106. This registration entry will be included in the target tenant information 138, and it will identify target service 110, and the permissions associated with target service 110. The administrator may also generate a secret (e.g., a password, a certificate, etc.) associated with the target service 110 that is registered in target tenant scope 134, and store that secret with authorization server 140. The administrator may provide other services (such as service 110) with access to that key as well. This registration in target tenant information 138 will be scoped so that it cannot be seen or accessed by other organizations, such as source tenant computing system 104. It is also assumed that resources 112 are registered in target tenant scope 134, and that resources 124 are registered in source tenant scope 136. The resources illustratively have a unique identifier and can be represented by well-known first party applications, custom third-party applications, etc.

Figure 2:
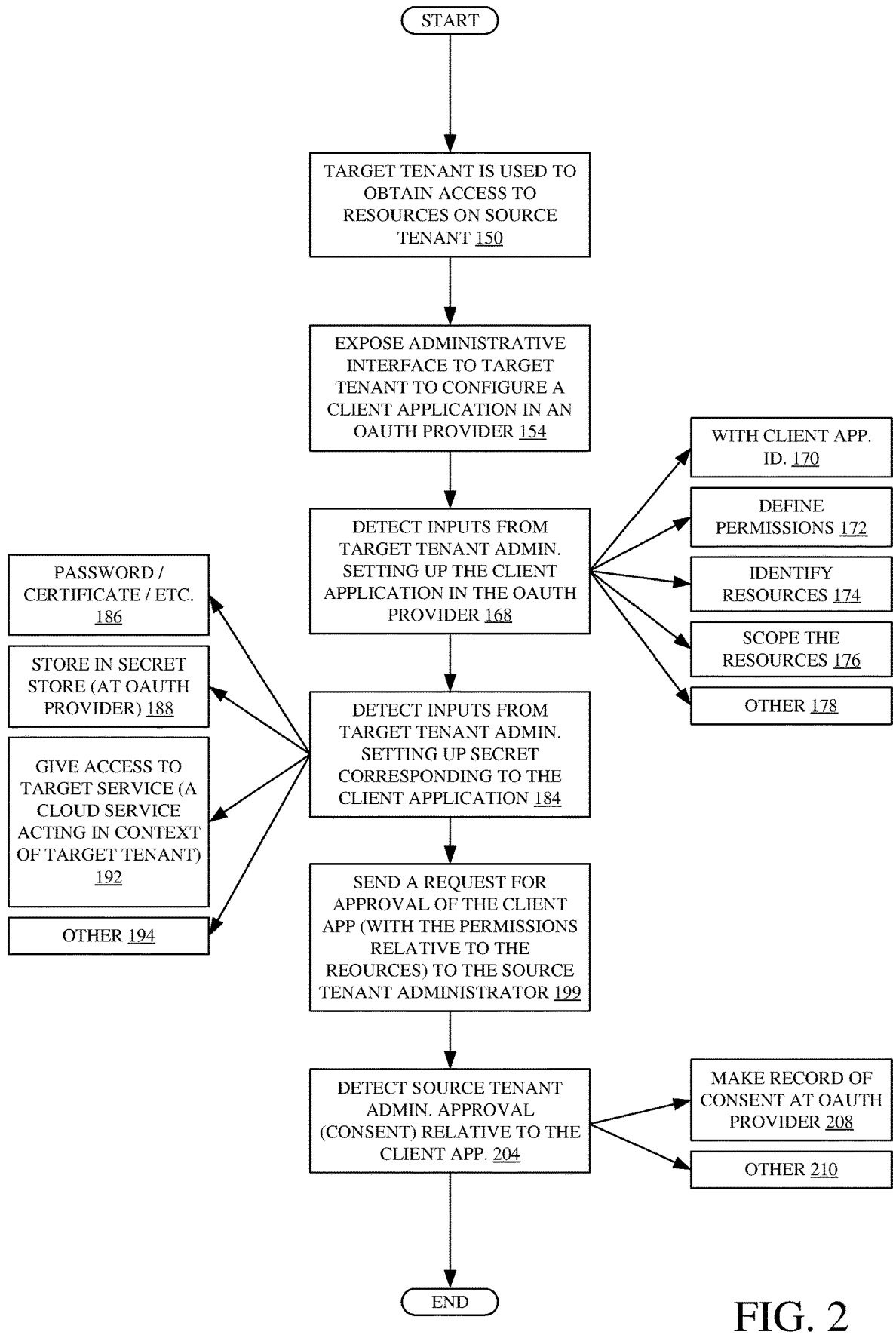
FIG. 2 is a flow diagram illustrating the operation of the architecture in FIG. 1 in configuring an OAuth provider system with a client application, in a target tenant scope.
Figure 3:
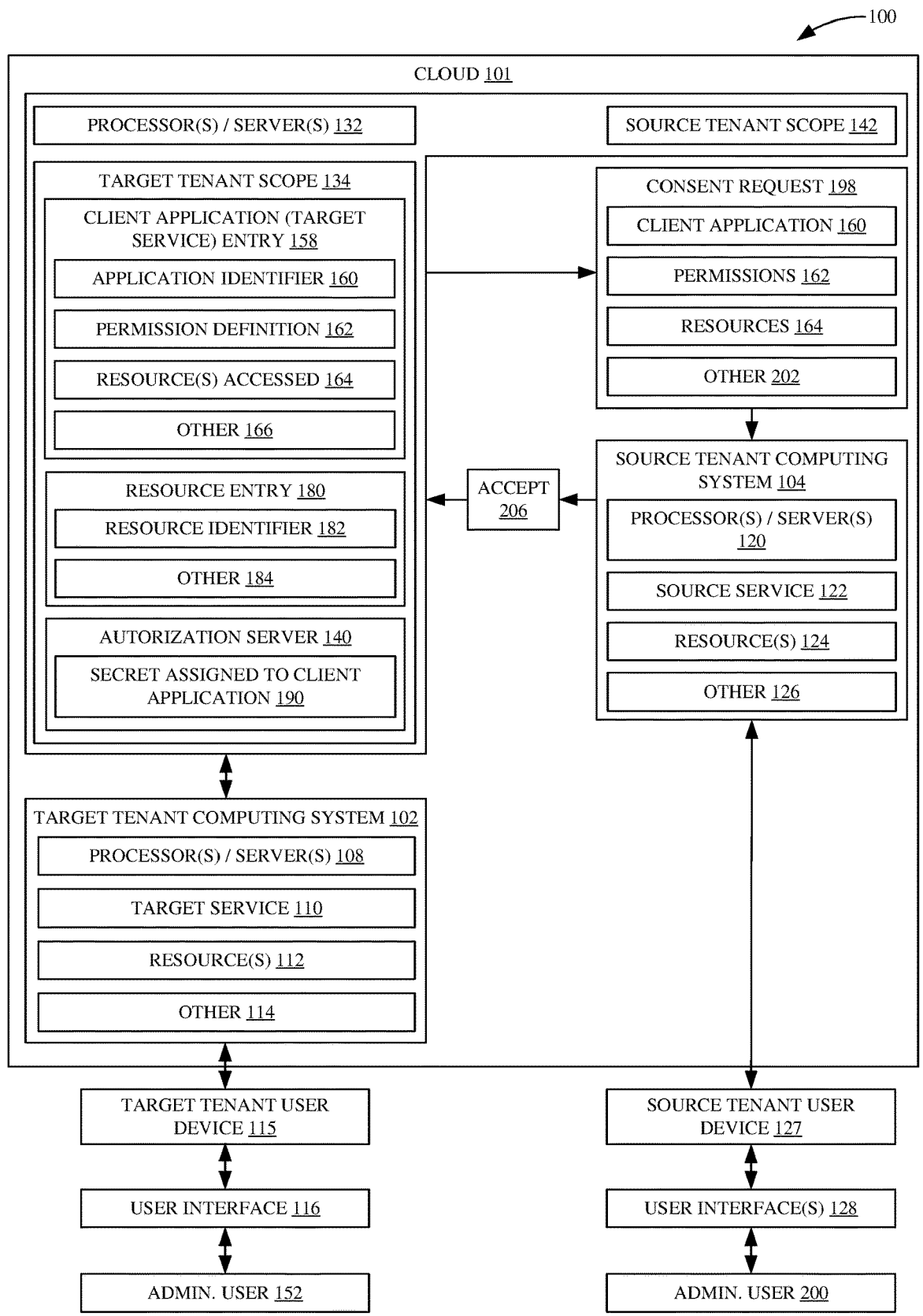
FIG. 3 is a block diagram showing the architecture illustrated in FIG. 1, with the client application configured in the target tenant scope of the OAuth provider.

FIG. 2 is a flow diagram illustrating one example of the operation of the architecture 100 illustrated in FIG. 1, in allowing an administrative user of target tenant computing system 102 to configure a client application in target tenant scope 134 for the purposes of allowing target service 110 to obtain access to resources 124 in source tenant computing system 104. FIG. 3 is a block diagram of architecture 100, similar to that shown in FIG. 1, and similar items are similarly numbered. However, FIG. 3 shows some portions of target tenant scope 134, in more detail. FIGS. 2 and 3 will now be described in conjunction with one another.

It is first assumed that the target tenant computing system 102 is used to obtain access to resources 124 on the source tenant computing system 104. This is indicated by block 150 in the flow diagram of FIG. 2. Target tenant computing system 102 exposes an administrative user interface 116 for interaction by an administrative user 152. The interface 116 is configured to allow administrative user 152 to configure a client application in the target tenant scope 134 of OAuth provider system 106. Exposing the interface to allow administrative user 152 to configure the client application is indicated by block 154 in the flow diagram of FIG. 2.

Administrative user 152 then provides inputs configuring the client application (e.g., making a client application entry 158 representing the client application—such as representing target service 110 or another application). The client application entry 158 will illustratively include an application identifier 160 that uniquely identifies the client application, a permission definition 162 that defines the permissions associated with the client application, as well as an identifier of the resources to be accessed 164. It can include other items 166 as well.

Therefore, for purposes of the present description, it will be assumed that the permission definition 162 defines the permissions (e.g., mailbox migration) relative to the resources 124 to be accessed, as identified by the resources identifier 164. Detecting inputs from the target tenant administrator setting up the client application in OAuth provider 106 is indicated by block 168 in the flow diagram of FIG. 2. Detecting a client application identifier 160 is indicated by block 170 in the flow diagram of FIG. 2. Detecting the permission definition 162 is indicated by block 172 in the flow diagram of FIG. 2. Detecting the resources identifier 164 is indicated by block 174 in the flow diagram of FIG. 2.

It will also be noted that the resources 164 can be scoped as well. For instance, assume that the mailboxes to be migrated from source tenant computing system 104 to target tenant computing system 102 are only the mailboxes that are part of a particular business unit. In that case, the administrative user 200 can scope the resources identified by the resource identifier 164 to include only the particular mailboxes to be migrated. Scoping the resources is indicated by block 176 in the flow diagram of FIG. 2. The inputs from the target tenant administrator 152, setting up the client application in OAuth provider 106 can include other items 178 as well.

FIG. 3 also shows that the resources 112 are also represented in target tenant scope 134 by a resource entry 180. The resource entry 180 can include a resources identifier 182 as well as other items 184.

Target tenant computing system 102 then exposes an interface 116 that can be used by administrative user 152 in order to set up a secret (e.g., a password, a certificate, etc.) and associate that secret with the client application 158 that is registered in the target tenant scope 134 of OAuth provider 106. Detecting the input setting up the secret is indicated by block 184 in the flow diagram of FIG. 2. Setting up the secret as a password or certificate, etc., is indicated by block 186.

In one example, administrative user 152 then stores the secret in a secret store which may be implemented in the authorization server 140 of OAuth provider 106. Storing the secret in a secret store in the OAuth provider is indicated by block 188 in the flow diagram of FIG. 2, and the secret, assigned to the client application entry 158, is also represented by block 190 in the block diagram of FIG. 3.

The administrative user 152 then provides inputs granting access to the secret 190 to a cloud service representing target tenant computing system 102 (e.g., target service 110). Therefore, target service 110 can access the secret 190 that is assigned to the client application represented by client application entry 158 in the target tenant scope 134 of OAuth provider 106. Granting access to the target service is indicated by block 192 in the flow diagram of FIG. 2. The inputs provided by administrative user 152 to set up the secret can include other items 194 as well.

Administrative user 152 then provides an input so that authorization server 140 sends a request for consent 198 to administrative user 200 of source tenant computing system 104. The request for consent 198 includes a client application identifier 160 that identifies the client application represented by client application entry 158. It also includes the permission definition 162 that define the permissions granted to the client application, as well as the resource identifier 164 that identifies the resources that will be accessed by the client application. The request for consent 198 can include other items 202 as well.

The request for consent 198 is illustratively surfaced for administrative user 200 on user interfaces 128. Thus, administrative user 200 can easily identify the particular application that is requesting access to resources 124, the permissions, or type of access (mailbox migration) that is being requested, the particular resources 124 for which access is being requested (and a scope of those resources, where one is provided). Sending the request for consent is indicated by block 199 in the flow diagram of FIG. 2.

Administrative user 200 then illustratively interacts with user interfaces 128 in order to provide approval of the request for consent, relative to the client application representing in the request for consent. This is indicated by block 204 in the flow diagram of FIG. 2. The approval or acceptance of the request for consent is also indicated by block 206 in the block diagram of FIG. 3. Authorization server 140 then makes record of the consent in target tenant scope 134 of OAuth provider 106. This is indicated by block 208 in the flow diagram of FIG. 2. Detecting the source tenant administrative approval or acceptance of the request for consent 198 can be done or detected in other ways as well. This is indicated by block 210 in the flow diagram of FIG. 2.

Figure 4:
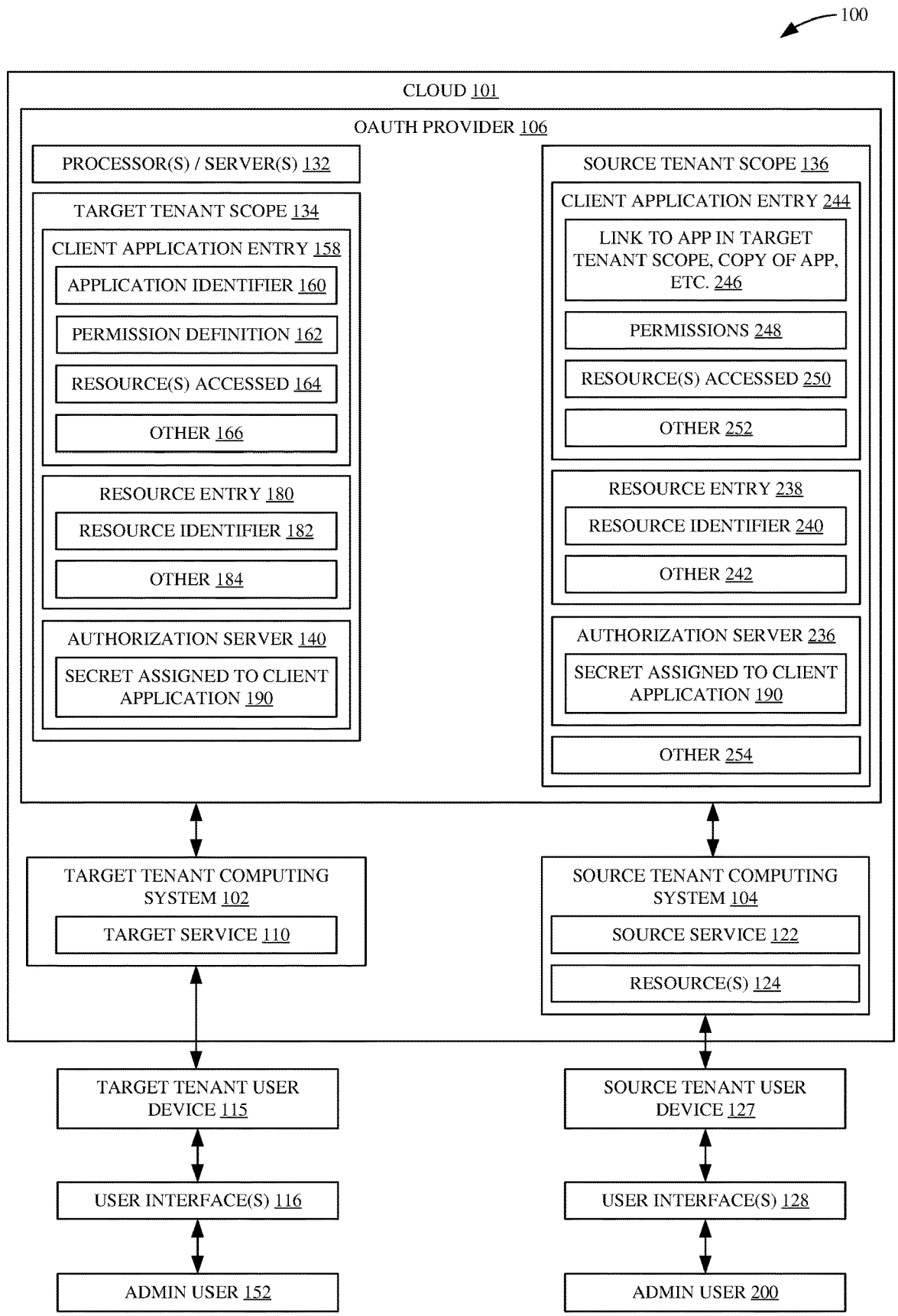
FIG. 4 is a block diagram showing one example of the OAuth provider in more detail.
Figure 5:
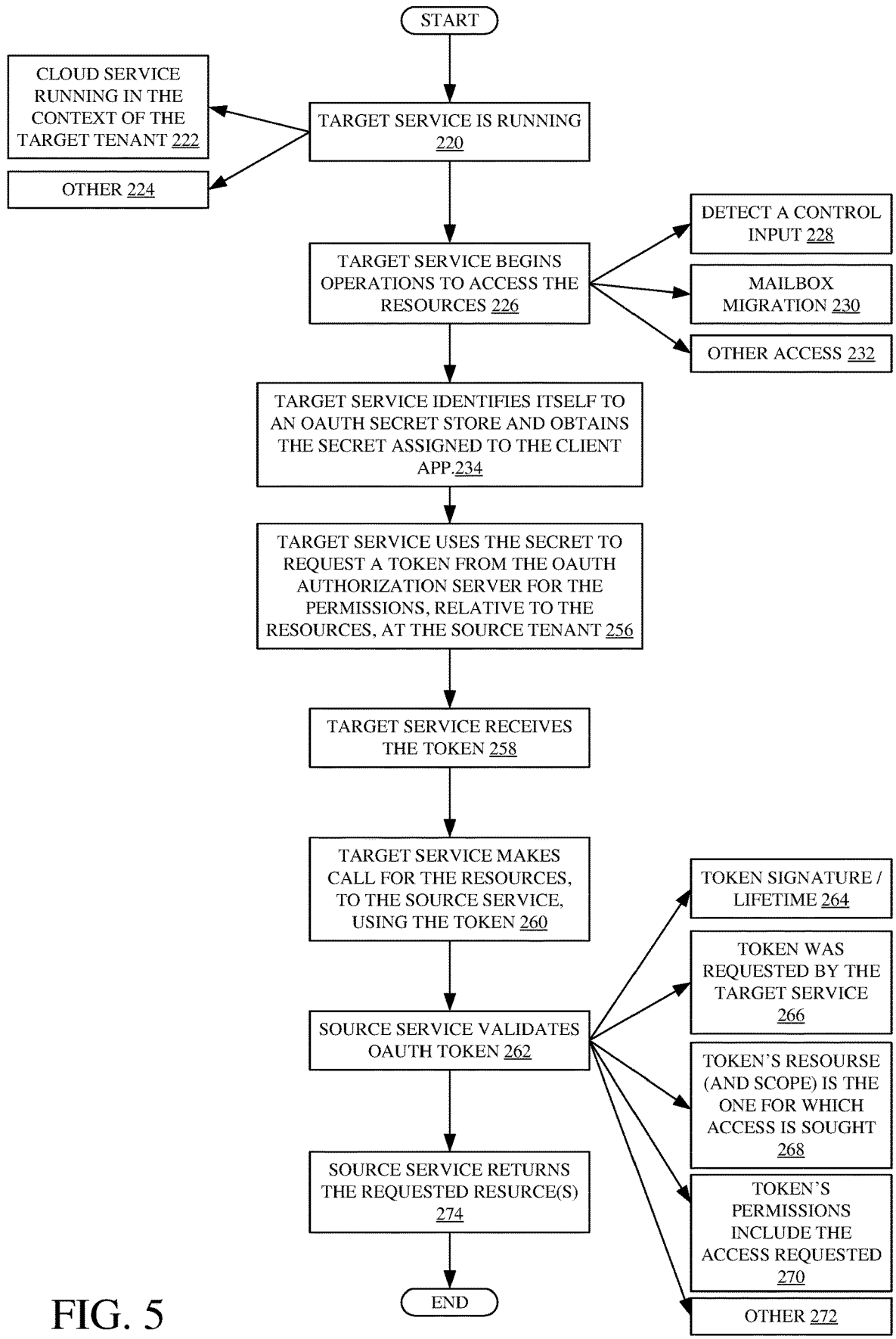
FIG. 5 is a flow diagram illustrating one example of the operation of the architecture illustrated in FIG. 1 in which a target service accesses a resource served by a source service, with authorization provided by the OAuth provider.

FIG. 4 is a block diagram of the computing system architecture 100 in which source tenant scope 136 is shown in more detail. FIG. 5 is a flow diagram illustrating the operation of architecture 100 in allowing target service 110 (which is a cloud service representing, or acting on behalf of, target tenant computing system 102) to access the requested resources 124 in source tenant computing system 102. Some items in FIG. 4 are similar to those shown in FIGS. 1 and 3, and they are similarly numbered. FIGS. 4 and 5 will now be described in conjunction with one another.

Briefly referring again to block 208 in FIG. 2, when the source tenant administrative user 200 provides the acceptance 206 to the request for consent 198, then the authorization server makes a client application entry 244, of record in the source tenant scope 136 of OAuth provider 106. The client application entry, which administrative user 200 has just consented to, will illustratively include a link to the application in the target tenant scope 134, or a copy of the application, etc. This is indicated by block 246 in the client application entry 244. The client application entry 246 will also identify the permissions 248 which correspond to the permission definition 162 of the client application entry 158 in the target tenant scope. This indicates the particular permissions 248 that administrative user 200 has consented to. The client application entry 244 will also include a resource identifier 250 that identifies the resources 124 that are to be accessed by the client application. Again, if the resources have been scoped, then the resource identifier 250 that identifies the resources that can be accessed, will be scoped as well. The client application entry can include other items 252 as well.

Further, when administrative user 200 authorizes or consents to the request 198, then authorization server 236 also illustratively stores the secret 190 corresponding to the client application that administrative user 200 has just consented to. Source tenant scope 136 can include other items 254 as well.

It is assumed that the target service 110, which is a cloud service acting on behalf of tenant computing system 102, is running in cloud 101. This is indicated by block 220 in the flow diagram of FIG. 5. It is assumed that target service 110 is a cloud service running in the context of target tenant computing system 102. This is indicated by block 222. The target service can be running in other ways as well, and this is indicated by block 224.

At some point, target service 110 begins operations to access the resources 124 of source tenant computing system 104. This is indicated by block 226. For example, it may be that administrative user 152 provides an input controlling target service 110 to begin the migration of the mailboxes in resources 124. Detecting a control input to begin accessing the resources 124 is indicated by block 228 in the flow diagram of FIG. 5. Continuing with the present example, it is assumed that target service 110 is used to access mailboxes in resources 124 in order to migrate them from source tenant computing system 104 to target tenant computing system 102. Having the resource accessing operation be to migrate mailboxes, is just one example, and it is indicated by block 230. The target service 110 can begin other resource access as well, and this is indicated by block 232.

Target service 110 first identifies itself to authorization server 140 in the target tenant scope 134 of OAuth provider 106. Because administrative user 152 has indicated that target service 110 has access to the secret 190 assigned to the client application, authorization server 140 provides the secret 190 to target service 110. Having target service 110 identify itself to the authorization server 140 and obtain the secret 190 is indicated by block 234 in the flow diagram of FIG. 5.

Target service 110 knows that source service 122 (which serves resources 124) has a corresponding authorization server 236 in the source tenant scope 136 of OAuth provider 106. It is assumed that resources 124 are represented by a resource entry 238 in source tenant scope 136. The resource entry may include a resource identifier 240 that identifies resources 124, and it can include other items 242.

Target service 110 uses the secret 190, that it has obtained, to request either an authorization token or an access token from authorization server 236, for the permissions 162 relative to the resources 124 that are to be accessed. Continuing with the present example, it uses secret 190 to request an authorization token from authorization server 236 to migrate the identified mailboxes in resources 124. Using the secret to request a token from authorization server 236 is indicated by block 256 in the flow diagram of FIG. 5. Authorization server 236 examines the secret 190 and determines that target service 110 is authorized to receive an authorization token. Receiving the token from authorization server 236 is indicated by block 258 in the flow diagram of FIG. 5.

Target service 110 then uses the authorization token to make a call to source service 122 for the desired resources 124 (e.g., for the set of mailboxes). Making the call to the source service for the resources, using the token, is indicated by block 260 in the flow diagram of FIG. 5.

Source service 122 then illustratively uses authorization server 236 to validate the authorization token. This is indicated by block 262. For instance, it may authorize the token signature and lifetime, as indicated by block 264. It may validate that the token was actually requested by the target service 110 that is presenting it. This is indicated by block 266. It may validate that the token's resource (and scope) is the one for which access is sought. This is indicated by block 268. It may validate that the token's permissions include the access requested. This is indicated by block 270. Authorization server 236 can validate the token in other ways as well, and this is indicated by block 272.

Once source service 122 determines that the token is valid, then it returns the requested resources 124 (e.g., it permits and facilitates the migration of the identified mailboxes). This is indicated by block 274.

It can thus be seen that the present description has described a system in which a service from one tenant can access resources in another tenant using an authorization framework. This is done without providing any external services, with any type of global or ubiquitous permissions. Instead, only the permissions needed for the desired data access are granted, and the authorization platform ensures that the requesting service has the appropriate authorization token to proceed.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The earlier FIGS. show architecture 100 with elements disposed in a cloud computing architecture. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
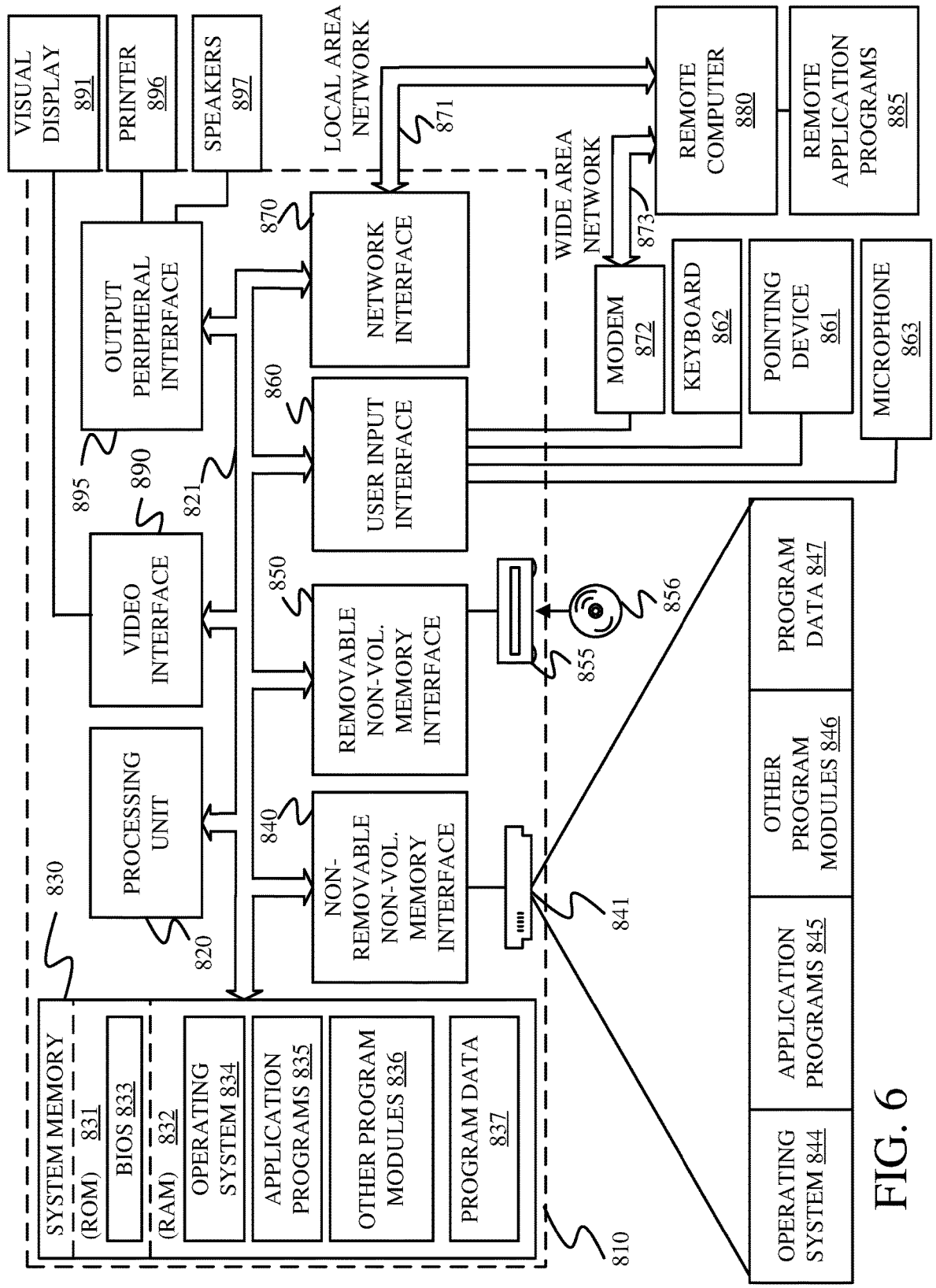
FIG. 6 is a block diagram of one example of a computing environment that can be used in the architectures shown in the previous figures.

FIG. 6 is one example of a computing environment in which architecture 100, or parts of it, (for example) can be deployed. With reference to FIG. 6, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:

receiving, from a target tenant computing system, a client application administrator input;

generating a client application entry in a target tenant scope of an OAuth provider, based on the client application administrator input, the client application entry including a client application identifier identifying a client application and a resource identifier that defines a set of resources, served by a source tenant service, to be accessed by the client application and a permissions definition that defines a set of permissions to perform operations on the set of resources;

receiving a secret corresponding to the client application and a target service authorization authorizing a target service to access the secret;

storing the secret and the target service authorization in the OAuth provider;

receiving, from a source tenant computing system, acceptance of a request for consent, the request for consent identifying the client application, the set of permissions and the set of resources;

based on the acceptance of the request for consent, generating a client application entry in a source tenant scope of the OAuth provider, the client application entry in the source tenant scope including a client application identifier identifying the client application and a resource identifier that defines the set of resources, served by the source tenant service, to be accessed by the client application and a permissions definition that defines the set of permissions;

receiving, at an authorization server coupled to the source tenant computing system, from the target service, a request for a token authorizing access to the resources, the request for the token including the secret; and sending the token to the target service.

Example 2 is the computer implemented method of any or all previous examples wherein receiving the request for a token comprises:

receiving target service credentials identifying the client service; and authorizing the request for a token based on the target service credentials and the secret.

Example 3 is the computer implemented method of any or all previous examples and further comprising:

receiving at the authorization server coupled to the source tenant computing system, from the source tenant computing system, a token that was received by the source tenant computing system along with a call from the target service for the set of resources; and validating the token at the authorization server coupled to the source service.

Example 4 is the computer implemented method of any or all previous examples and further comprising:

after validating the token, communicating to the source service that the token is validated.

Example 5 is the computer implemented method of any or all previous examples wherein the token includes a signature and a lifespan, and wherein validating the token comprises:

validating the token signature and lifespan.

Example 6 is the computer implemented method of any or all previous examples wherein validating the token comprises:

validating that the token was requested by the target service.

Example 7 is the computer implemented method of any or all previous examples wherein validating the token comprises:

validating that resources corresponding to the token include the set of resources for which access is sought in the call from the target service.

Example 8 is the computer implemented method of any or all previous examples wherein validating the token comprises:

validating that permissions authorized by the token include the set of permissions sought in the call from the target service.

Example 9 is the computer implemented method of any or all previous examples wherein receiving the secret comprises:

receiving a target tenant administrator input indicative of a password corresponding to the client application.

Example 10 is the computer implemented method of any or all previous examples wherein receiving the secret comprises:

receiving a target tenant administrator input indicative of a certificate corresponding to the client application.

Example 11 the computer implemented method of any or all previous examples wherein storing the secret comprises:

storing the secret in the target tenant scope of the OAuth provider.

Example 12 is a computer system, comprising:

one or more processors; and memory storing instructions which, when executed by the one or more processors, cause the one or more processors to perform steps comprising:

receiving, from a target tenant computing system, a client application administrator input;

generating a client application entry in a target tenant scope of an OAuth provider, based on the client application administrator input, the client application entry including a client application identifier identifying a client application and a resource identifier that defines a set of resources, served by a source tenant service, to be accessed by the client application and a permissions definition that defines a set of permissions to perform operations on the set of resources;

receiving a secret corresponding to the client application and a target service authorization authorizing a target service to access the secret;

storing the secret and the target service authorization in the OAuth provider;

receiving, from a source tenant computing system, acceptance of a request for consent, the request for consent identifying the client application, the set of permissions and the set of resources;

based on the acceptance of the request for consent, generating a client application entry in a source tenant scope of the OAuth provider, the client application entry in the source tenant scope including a client application identifier identifying the client application and a resource identifier that defines the set of resources, served by the source tenant service, to be accessed by the client application and a permissions definition that defines the set of permissions;

receiving, at an authorization server coupled to the source tenant computing system, from the target service, a request for a token authorizing access to the resources, the request for the token including the secret;

receiving target service credentials identifying the client service;

authorizing the request for a token based on the target service credentials and the secret; and sending the token to the target service.

Example 13 is the computer system of any or all previous examples wherein generating the client application entry in the target scope of the OAuth provider comprises:

receiving a resource scoping input scoping the set of resources to a subset of the resources; and storing, as the resource identifier, a scoped resource identifier scoped to the subset of resources.

Example 14 is the computer system of any or all previous examples and wherein the instructions cause the one or more processors to perform steps further comprising:

receiving at the authorization server coupled to the source tenant computing system, from the source tenant computing system, a token that was received by the source tenant computing system along with a call from the target service for the set of resources; and validating the token at the authorization server coupled to the source service.

Example 15 is the computer system of any or all previous examples and further comprising:

after validating the token, communicating to the source service that the token is validated.

Example 16 is the computer system of any or all previous examples wherein the token includes a signature and a lifespan, and wherein validating the token comprises at least one of:

validating the token signature and lifespan;

validating that the token was requested by the target service;

validating that resources corresponding to the token include the set of resources for which access is sought in the call from the target service; or validating that permissions authorized by the token include the set of permissions sought in the call from the target service.

Example 17 is the computer system of any or all previous examples wherein receiving the secret comprises:

receiving a target tenant administrator input indicative of a password corresponding to the client application.

Example 18 is the computer system of any or all previous examples wherein receiving the secret comprises:

receiving a target tenant administrator input indicative of a certificate corresponding to the client application.

Example 19 is the computer system of any or all previous examples wherein storing the secret comprises:

storing the secret in the target tenant scope of the OAuth provider.

Example 20 is a computing system that provides a multi-tenant authorization platform for providing a target tenant computing system with access to resources of a source tenant computing system, comprising:

one or more processors that implement an OAuth provider having a target tenant scope that receives, from a target tenant computing system, a client application administrator input and generates a client application entry in the target tenant scope of an OAuth provider, based on the client application administrator input, the client application entry including a client application identifier identifying a client application and a resource identifier that defines a set of resources, served by a source tenant service, to be accessed by the client application and a permissions definition that defines a set of permissions to perform operations on the set of resources;

memory comprising a secret store that receives and stores a secret corresponding to the client application and a target service authorization authorizing a target service to access the secret;

the OAuth provider having a source tenant scope and being further configured to receive, from a source tenant computing system, acceptance of a request for consent, the request for consent identifying the client application, the set of permissions and the set of resources, and, based on the acceptance of the request for consent, generate a client application entry in the source tenant scope of the OAuth provider, the client application entry in the source tenant scope including a client application identifier identifying the client application and a resource identifier that defines the set of resources, served by the source tenant service, to be accessed by the client application, and a permissions definition that defines the set of permissions; and an authorization server coupled to the source tenant computing system, and receiving from the target service, a request for a token authorizing access to the resources, the request for the token including the secret, the authorization server being configured to validate the request for the token and to send the token to the target service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:

receiving, from a target tenant computing system, a client application administrator input;

generating a first client application entry in a target tenant scope of an OAuth provider, based on the client application administrator input, the first client application entry in the target tenant scope including a first client application identifier identifying a client application and a first resource identifier that defines a set of resources, served by a source tenant service corresponding to a source tenant computing system, to be accessed by the client application and a first permissions definition that defines a set of permissions to perform operations on the set of resources;

receiving a secret corresponding to the client application and a target service authorization authorizing a target service corresponding to the target tenant computing system to access the secret;

storing the secret and the target service authorization in the OAuth provider;

receiving, from the source tenant computing system, acceptance of a request for consent, the request for consent identifying the client application, the set of permissions and the set of resources;

based on the acceptance of the request for consent, generating a second client application entry in a source tenant scope of the OAuth provider, the second client application entry in the source tenant scope including a second client application identifier identifying the client application and a second resource identifier that defines the set of resources, served by the source tenant service, to be accessed by the client application and a second permissions definition that defines the set of permissions;

receiving, at an authorization server coupled to the source tenant computing system, from the target service, a request for a token authorizing access to the resources, the request for the token including the secret;

authorizing the target service to receive the token based on the request including the secret and based on the set of permissions; and sending the token to the target service.

2. The computer implemented method of claim 1 wherein receiving the request for a token comprises:

receiving target service credentials identifying the target service; and authorizing the request for a token based on the target service credentials and the secret.

3. The computer implemented method of claim 1 and further comprising:

receiving at the authorization server coupled to the source tenant computing system, from the source tenant computing system, a token that was received by the source tenant computing system along with a call from the target service for the set of resources; and validating the token at the authorization server coupled to the source service.

4. The computer implemented method of claim 3 and further comprising:

after validating the token, communicating to the source service that the token is validated.

5. The computer implemented method of claim 3 wherein the token includes a signature and a lifespan, and wherein validating the token comprises:

validating the token signature and lifespan.

6. The computer implemented method of claim 3 wherein validating the token comprises:

validating that the token was requested by the target service.

7. The computer implemented method of claim 6 wherein validating the token comprises:

validating that resources corresponding to the token include the set of resources for which access is sought in the call from the target service.

8. The computer implemented method of claim 6 wherein validating the token comprises:

validating that permissions authorized by the token include the set of permissions sought in the call from the target service.

9. The computer implemented method of claim 1 wherein receiving the secret comprises:

receiving a target tenant administrator input indicative of a password corresponding to the client application.

10. The computer implemented method of claim 1 wherein receiving the secret comprises:

receiving a target tenant administrator input indicative of a certificate corresponding to the client application.

11. The computer implemented method of claim 1 wherein storing the secret comprises:

storing the secret in the target tenant scope of the OAuth provider.

12. A computer system, comprising:

one or more processors; and memory storing instructions which, when executed by the one or more processors, cause the one or more processors to perform steps comprising:

receiving, from a target tenant computing system, a client application administrator input;

generating a first client application entry in a target tenant scope of an OAuth provider, based on the client application administrator input, the first client application entry in the target tenant scope including a first client application identifier identifying a client application and a first resource identifier that defines a set of resources, served by a source tenant service corresponding to a source tenant computing system, to be accessed by the client application and a first permissions definition that defines a set of permissions to perform operations on the set of resources;

receiving a secret corresponding to the client application and a target service authorization authorizing a target service corresponding to the target tenant computing system to access the secret;

storing the secret and the target service authorization in the OAuth provider;

receiving, from the source tenant computing system, acceptance of a request for consent, the request for consent identifying the client application, the set of permissions and the set of resources;

based on the acceptance of the request for consent, generating a second client application entry in a source tenant scope of the OAuth provider, the second client application entry in the source tenant scope including a second client application identifier identifying the client application and a second resource identifier that defines the set of resources, served by the source tenant service, to be accessed by the client application and a second permissions definition that defines the set of permissions;

receiving, at an authorization server coupled to the source tenant computing system, from the target service, a request for a token authorizing access to the resources, the request for the token including the secret;

receiving target service credentials identifying the target service;

authorizing the target service to receive the token based on the target service credentials and the secret; and sending the token to the target service.

13. The computer system of claim 12 wherein generating the client application entry in the target scope of the OAuth provider comprises:

receiving a resource scoping input scoping the set of resources to a subset of the resources; and storing, as the resource identifier, a scoped resource identifier scoped to the subset of resources.

14. The computer system of claim 12 and wherein the instructions cause the one or more processors to perform steps further comprising:

receiving at the authorization server coupled to the source tenant computing system, from the source tenant computing system, a token that was received by the source tenant computing system along with a call from the target service for the set of resources; and validating the token at the authorization server coupled to the source service.

15. The computer system of claim 14 and further comprising:

after validating the token, communicating to the source service that the token is validated.

16. The computer system of claim 14 wherein the token includes a signature and a lifespan, and wherein validating the token comprises at least one of:

validating the token signature and lifespan;

validating that the token was requested by the target service;

validating that resources corresponding to the token include the set of resources for which access is sought in the call from the target service; or validating that permissions authorized by the token include the set of permissions sought in the call from the target service.

17. The computer system of claim 12 wherein receiving the secret comprises:
   receiving a target tenant administrator input indicative of a password corresponding to the client application.

18. The computer system of claim 12 wherein receiving the secret comprises:
   receiving a target tenant administrator input indicative of a certificate corresponding to the client application.

19. The computer system of claim 12 wherein storing the secret comprises:
   storing the secret in the target tenant scope of the OAuth provider.

20. A computing system that provides a multi-tenant authorization platform for providing a target tenant computing system with access to resources of a source tenant computing system, comprising:
   one or more processors configured to implement an OAuth provider having a target tenant scope that receives, from a target tenant computing system, a client application administrator input and generates a first client application entry in the target tenant scope of the OAuth provider, based on the client application administrator input, the client application entry including a first client application identifier identifying a client application and a first resource identifier that defines a set of resources, served by a source tenant service, to be accessed by the client application and a first permissions definition that defines a set of permissions to perform operations on the set of resources;
   memory comprising a secret store that stores a secret corresponding to the client application and a target service authorization authorizing a target service to access the secret;
   the OAuth provider having a source tenant scope and being further configured to:
      receive, from a source tenant computing system, acceptance of a request for consent, the request for consent identifying the client application, the set of permissions and the set of resources; and
      based on the acceptance of the request for consent, generate a second client application entry in the source tenant scope of the OAuth provider, the second client application entry in the source tenant scope including a second client application identifier identifying the client application and a second resource identifier that defines the set of resources, served by the source tenant service, to be accessed by the client application, and a second permissions definition that defines the set of permissions; and
   an authorization server coupled to the source tenant computing system, and configured to:
      receive, from the target service, a request for a token authorizing access to the resources, the request for the token including the secret;
      authorize the target service to receive the token based on the request for the token including the secret and based on the set of permissions; and
      send the token to the target service.

\* \* \* \* \*